Aug. 19, 1952     A. JENSEN     2,607,565
UNIFORMLY POSITIONED SEALS FOR REGENERATIVE HEATERS
Filed Oct. 11, 1949     3 Sheets-Sheet 1

INVENTOR.
Arthur Jensen

ATTORNEY

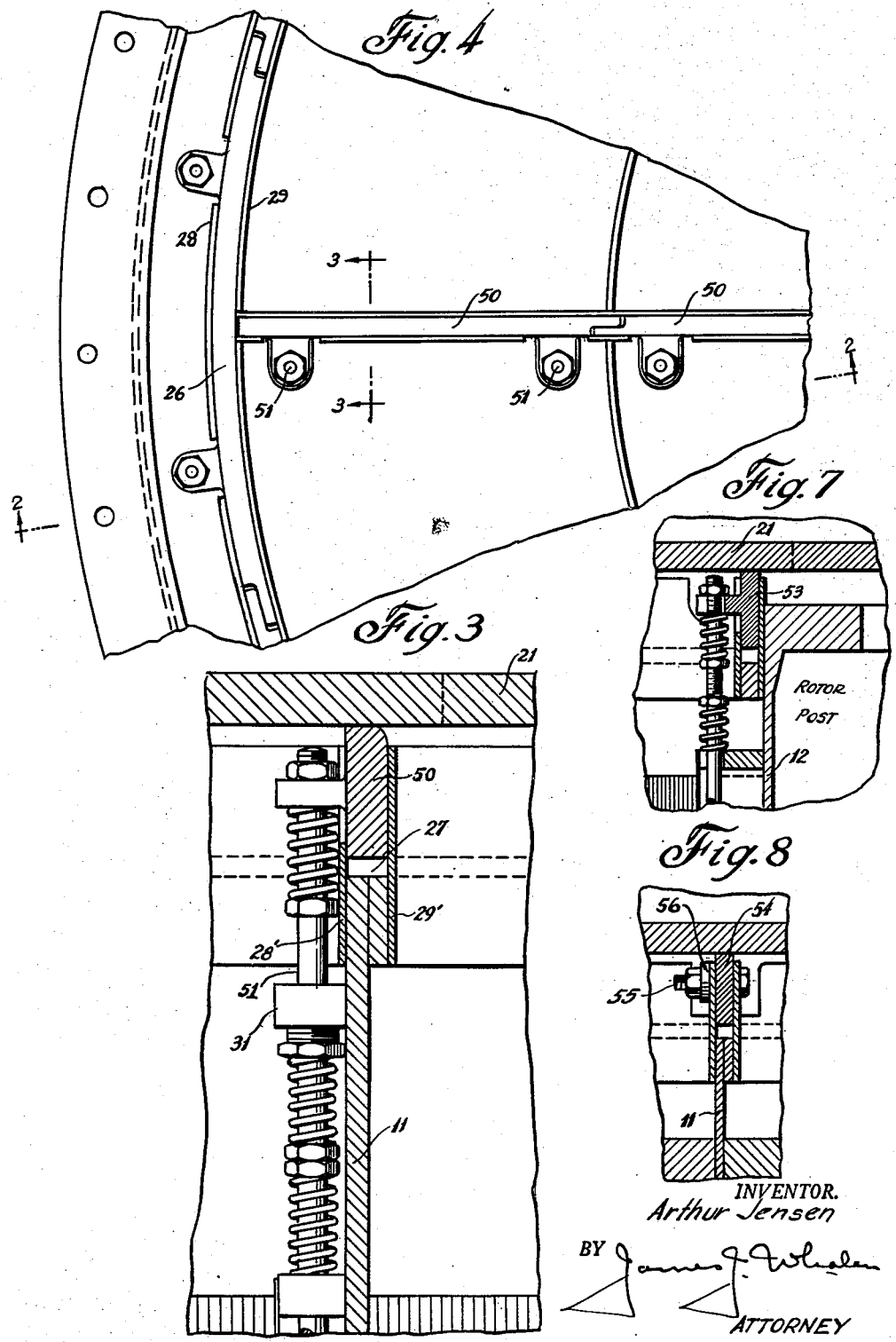

INVENTOR.
Arthur Jensen
BY
ATTORNEY

Patented Aug. 19, 1952

2,607,565

UNITED STATES PATENT OFFICE 2,607,565

UNIFORMLY POSITIONED SEALS FOR REGENERATIVE HEATERS

Arthur Jensen, Wellsville, N. Y., assignor to The Air Preheater Corporation, New York, N. Y.

Application October 11, 1949, Serial No. 120,628

3 Claims. (Cl. 257—6)

The present invention relates particularly to improved circumferential seals for use between the rotor and enclosing housing of a rotary regenerative air preheater or like apparatus.

A rotary regenerative heater of the Ljungstrom type has a cylindrical rotor divided into compartments carrying metallic heat transfer plates which as the rotor turns are first exposed to the heating gases and then disposed in the air passage to impart the absorbed heat to the air. The rotor is surrounded by a housing having end or sector plates formed with openings to provide for the flow of gas and air and in order to preclude the flow of gas or air through the clearance space between the rotor and housing without passing over the heat transfer material it is customary to provide the rotor with circumferential seals that bear against the sector plates or other stationary parts. Radial seals mounted on the partitions forming the compartments whose width is less than the gas and air openings prevent crossflow of fluids over the ends of the rotor.

The present invention contemplates improved forms of circumferential and radial seals in which advantage is taken of the fact that the end sector plates are held in spaced parallel relation by the housing enclosing the rotor. Assuming that these parallel surfaces are maintained within reasonable allowances over a complete circumference at any point from the center of unit, the circumferential seals carried on the perimeter of the rotor shell and on the rotor post at opposite ends of the rotor are biased apart and toward contact with these parallel surfaces to provide the circumferential seal. The radial seals are similarly biased for movement endwise of the partitions.

The invention will be best understood upon consideration of the following description of illustrative embodiments thereof when read in conjunction with the accompanying drawings in which:

Figure 3 is an enlarged view on line 3—3 of Fig. 4 showing the mounting of one of the radial seals.

Figure 4 is a fragmentary plan view corresponding to the previous figures.

Figure 5 is a view on an enlarged scale similar to Figure 2 showing alternative constructions for the seals while

Figure 7 is a fragmentary view on an enlarged scale showing the construction of a circumferential seal provided adjacent the ends of the rotor post; and Figure 8 is a fragmentary view on an enlarged scale illustrating a pivotal connection between radial and circumferential seals as indicated by section line 8—8 of Fig. 6.

Figure 1:
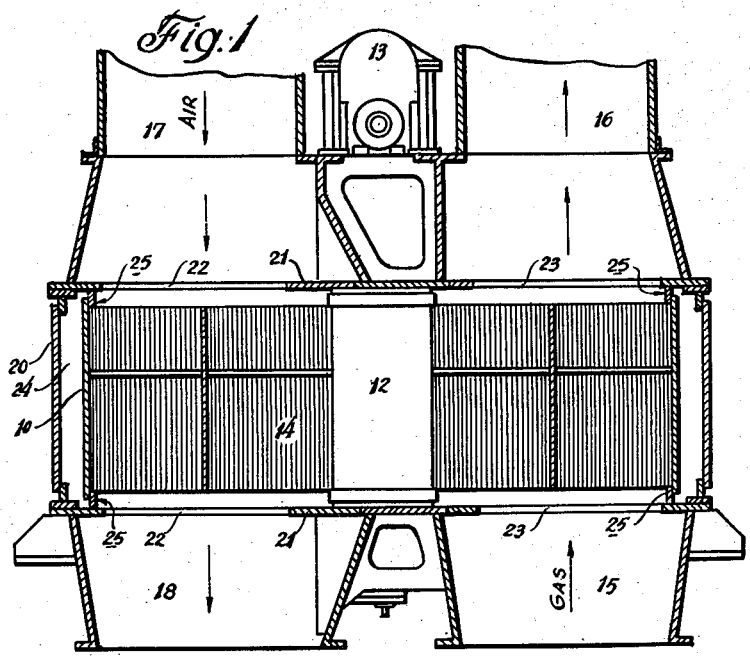
Figure 1 is a sectional elevational view in diagrammatic form of a rotor regenerative air preheater.

In the drawings the numeral 10 designates the cylindrical shell of a rotor that is divided into sector shaped compartments by radial partitions 11 connecting it with the rotor post 12 which is driven by a motor and reduction gearing 13 to turn the rotor slowly about its axis. The rotor compartments contain regenerative heat transfer material in the form of metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18. A housing 20 enclosing the rotor 10 is provided at either end opposite the latter with end or sector plates 21 which are apertured at 22 and 23 to permit streams of gas and air to enter and leave the preheater.

In order that the streams of gas and air may not by-pass the heat transfer surface 14 by flowing in the annular clearance space 24 between the rotor shell 10 and the housing 20 it is customary to provide circumferential seals on the shell 10 which wipe against the sector plates 21 or allied parts so as to seal off the space 24 at both ends of the rotor, these being diagrammatically shown at 25 in Fig. 1.

Figure 2:
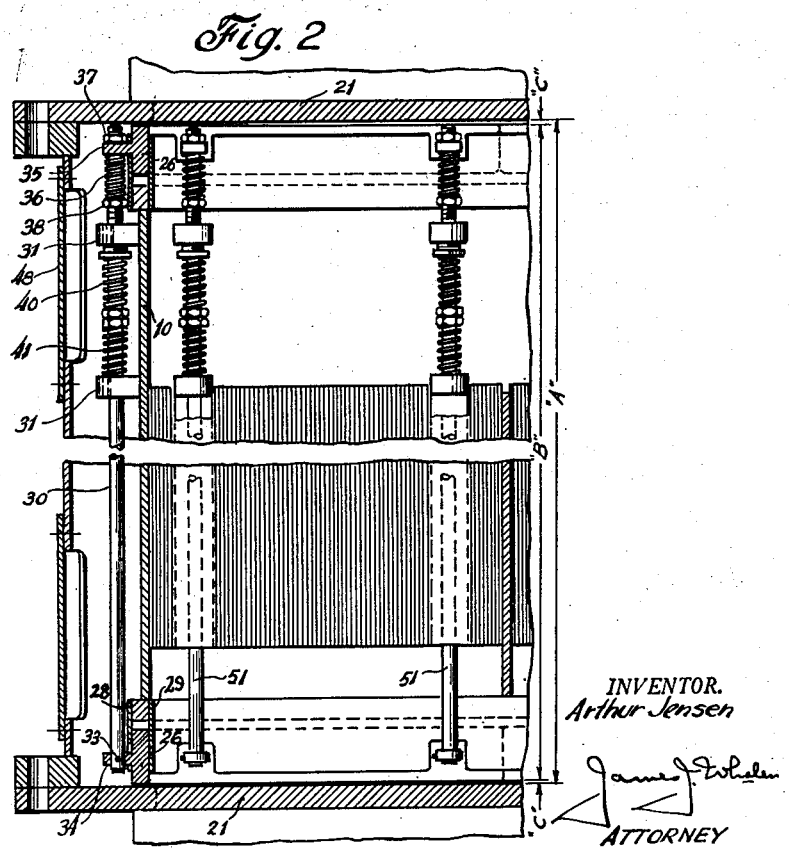
Figure 2 is a fragmentary view sectioned on line 2—2 of Fig. 4 drawn on an enlarged scale to show circumferential and radial sealing devices embodying the present invention.

In accordance with the present invention the circumferential seals shown on an enlarged scale in Figs. 2 to 4 comprise a plurality of segmental sealing shoes 26 slidably mounted for movement toward and away from the sector plate 21 in a groove 27 formed between the annular bands or plates 28, 29 attached to the end edge of the rotor shell 10 and extending completely around its perimeter. As appears in Fig. 4 the sealing shoes 26 are arcuated segments overlapping in rabbeted fashion at adjacent ends and the group in any of the grooves at the end of the rotor shell form a complete circle creating an annular sealing ring located in positions radially beyond the apertures 22, 23 in the end plates through which heating gas and air are admitted to and discharged from the rotor. As appears in Fig. 2 the seals 26 at the top and bottom edges of a vertically mounted rotor are physically interconnected by rods 30 extending through guide lugs 31 on the outside of the rotor shell 19. At its lower end the rod 30 is fixed as by a pin 33 to the lug 34 on the sealing segment 26 while the upper end of the rod 30 extends through the lug 35 on the upper shoe 26 and is resiliently connected thereto by means of the coil springs 36 and the cooperating nuts 37, 38 threaded on the rod and bearing respectively against the upper side of lug 35 and the lower end of spring 36. Other tension springs 40 and 41 are provided on the rod 30 and act to bias towards the seal shoes 26 at the top and bottom of the rotor, respectively, apart in opposite axial directions so as to tend to maintain contact with the imperforate portions of the end plates 21.

The operation of the seals 26 is based on the assumption, as mentioned above, that the parallel surfaces constituted by the inner faces of the end plates 21 that confront the rotor are maintained uniformly spaced within reasonable allowances throughout a complete circumference at various distances from the center of the rotor. The parallel surfaces provided by the connecting plates are spaced in their parallel relation by the rotor housing. The dimension A, Fig. 2 constituting the height of the rotor housing should remain fairly constant throughout the circumference at the position of the circumferential seal shoes 26. To avoid excess frictional drag the dimension B between the outer faces of the circumferential seals at the outer ends of the rotor may be set slightly less than dimension A. The seals 26 and the rotor 10 can change their relationship to each other when contact is made with either top or bottom end plate by compression of the springs 40 or 41. Beyond providing resilient connections of the upper seals the springs 36 operate only if binding occurs through changes in the dimensions A or B. When adjusting the seals 26 for vertically mounted rotors the load of the complete seal assembly is carried on the springs 41 and only slight tension is required on the spring 40 and the spring 36 acts only if binding occurs on both connecting end plates simultaneously. Adjustment of the circumferential seals 26 either upon installation of the preheater or during the operation may be made through access doors 48.

As appears in Figs. 3 and 4 the radial seals comprise a series of shoes 50 mounted in channels between bands 28' and 29' on the ends of the partition plates 11. Rods 51 and related springs similar to those provided for the circumferential seals act to maintain the radial seals in contact with the imperforate portions of the end plates 21 located beyond the air and gas apertures 23, 22.

Figure 5:
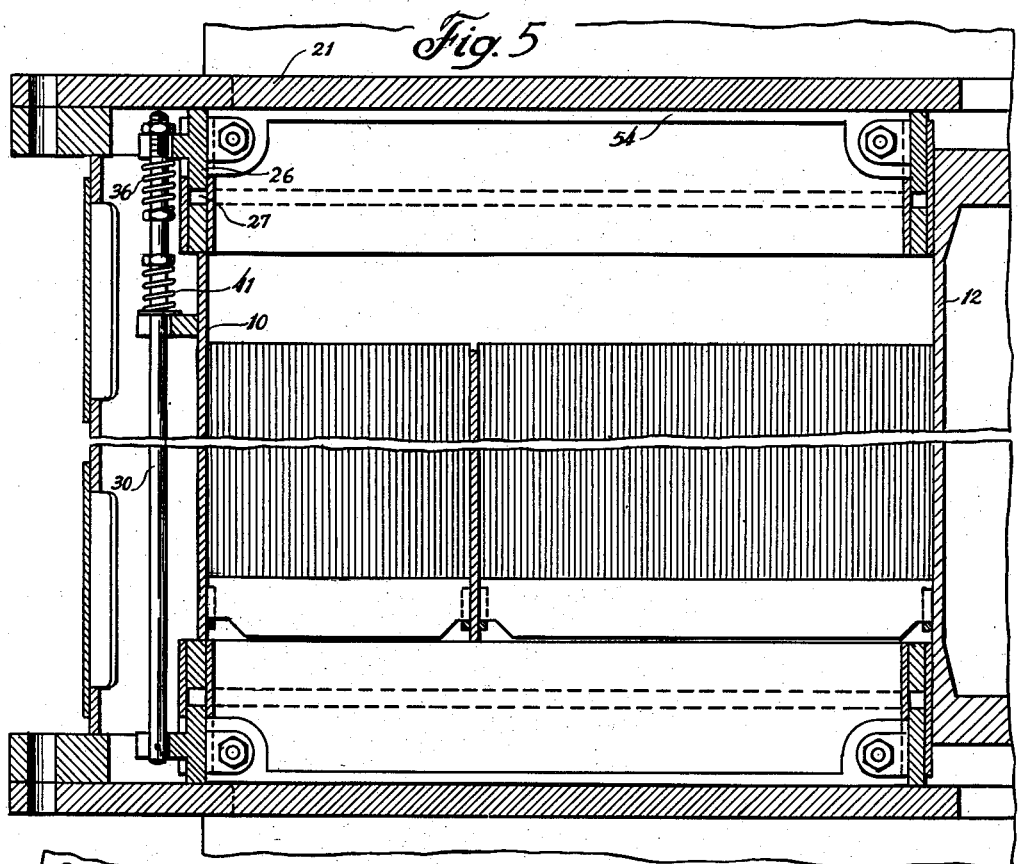
Figure 6:
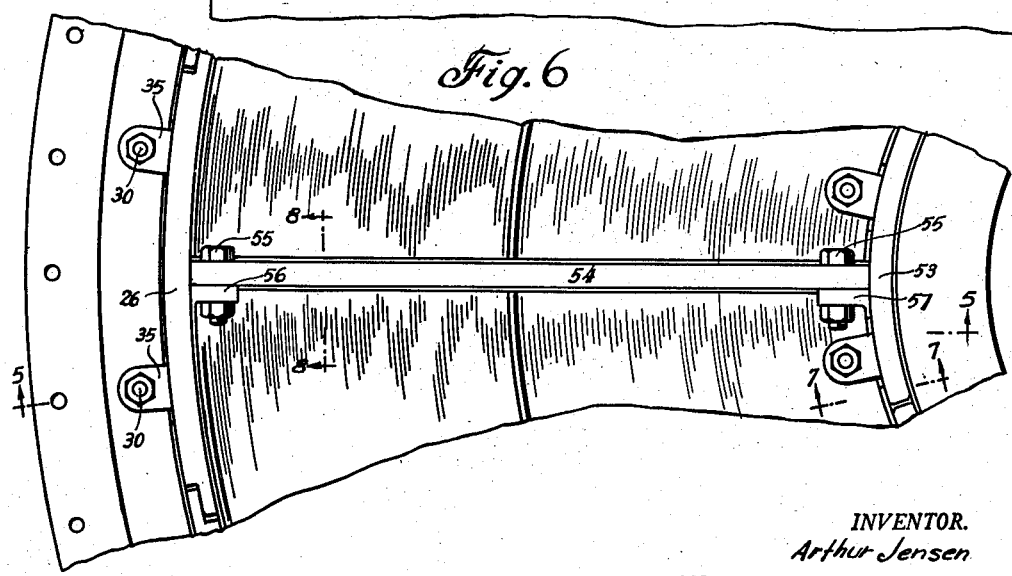
Figure 6 is a corresponding plan view.

In Figs. 5, 6 and 7 the rods 30 have associated therewith only the springs 36 and 41 are provided as the construction permits the spring 40 to be dispensed with. The construction illustrated in these figures also utilizes circumferential sealing shoes 53 mounted adjacent the upper and lower ends of the rotor posts in positions radially inward beyond the air and gas apertures 22, 23 in the end plates 21. These could also be provided in Figs. 1 to 4. A further difference here is that instead of being provided with their own tension rods, such as 51 in Fig. 2, the radial seal shoes 54 in Figs. 5 to 8 are connected by the bolts 55 to lugs 56 and 57 on the circumferential seals 26 and 53, respectively, so that the circumferential and radial seals may operate in unison, these circumferential seals being located radially beyond the inner and outer margins of the gas and air apertures in the end plates 21.

In operation it is not necessary for the radial or circumferential seals to continuously wipe against the imperforate portions of the end plates. Satisfactory operation is provided even though there may be a slight space C resulting from differences from the dimensions A and B. This arrangement is provided obviously to avoid excess frictional drag in the operation of the rotor and satisfactory sealing is afforded providing the gap C between the seals and the end plate is not of a substantial dimension.

What I claim is:

1. In apparatus having a rotor including a cylindrical shell connected to a rotor post by radial partitions and casing plates opposite the ends of the rotor formed with circumferentially spaced apertures for flow of separate fluids; improved gas seals engaging said end plates comprising circumferentially extending sealing shoes mounted on the end edges of the rotor shell and in radially spaced relation thereto on the rotor post in positions radially beyond the margins of the apertures in said end plates; radial seals carried by said partitions and pivotally connected at their radial ends to the sealing rings both on the rotor shell and adjacent the rotor post for movement therewith; and spring influenced means resiliently connecting corresponding seal shoes at opposite ends of the rotor and urging them apart into yielding contact with the end plate adjacent thereto.

2. Circumferential sealing devices as recited in claim 1 wherein said spring-influenced means include rods fixedly each connected to a sealing shoe at one end of the rotor and yieldingly connected to a correspondingly located shoe at the other end of the rotor; and rod guides attached to the rotor shell.

3. Circumferential sealing devices as recited in claim 1 wherein said spring-influenced means include rods fixedly each connected to a sealing shoe at one end of the rotor and yieldingly connected to a correspondingly located shoe at the other end of the rotor; and rod guides attached to the outer faces of the rotor shell.

ARTHUR JENSEN.

REFERENCES CITED

The following references are of record in the file of this patent:

UNITED STATES PATENTS

| Number | Name | Date |
|---|---|---|
| 2,460,746 | Guthrie et al. | Feb. 1, 1949 |
| 2,471,995 | Yerrick et al. | May 3, 1949 |
| 2,517,470 | Erisman | Aug. 1, 1950 |